United States Patent [19]
Taylor et al.

[11] Patent Number: 6,138,443
[45] Date of Patent: Oct. 31, 2000

[54] BAG DISCHARGE APPARATUS

[75] Inventors: Steven James Taylor, Burnley; Peter Swinton, Batley, both of United Kingdom

[73] Assignee: Spiroflow Limited, United Kingdom

[21] Appl. No.: 09/243,872

[22] Filed: Feb. 3, 1999

[51] Int. Cl.[7] .................................................. B65B 43/26
[52] U.S. Cl. ........................ 53/492; 53/570; 53/384.1
[58] Field of Search .................................. 53/492, 381.1, 53/384.1, 570

[56] References Cited

U.S. PATENT DOCUMENTS

| | | | |
|---|---|---|---|
| 4,291,517 | 9/1981 | Lipes ........................................ | 53/384.1 |
| 4,527,716 | 7/1985 | Haas et al. . | |
| 4,541,765 | 9/1985 | Moore . | |
| 4,665,552 | 5/1987 | Lems et al. ............................ | 53/384.1 |
| 4,700,755 | 10/1987 | Banys ...................................... | 53/384.1 |
| 5,184,759 | 2/1993 | Gill et al. . | |
| 5,535,791 | 7/1996 | Lisec . | |
| 5,664,406 | 9/1997 | Smith ...................................... | 53/384.1 |
| 5,699,730 | 12/1997 | Ogier . | |
| 5,768,863 | 6/1998 | McGregor et al. .................... | 53/384.1 |

FOREIGN PATENT DOCUMENTS

| | | |
|---|---|---|
| 904572 | 8/1962 | United Kingdom . |
| 1418163 | 12/1975 | United Kingdom . |
| 2150538 | 7/1985 | United Kingdom . |
| 2216504 | 10/1989 | United Kingdom . |
| 2240965 | 8/1991 | United Kingdom . |
| 2267899 | 12/1993 | United Kingdom . |
| 2268164 | 1/1994 | United Kingdom . |

*Primary Examiner*—Eugene Kim
*Attorney, Agent, or Firm*—Adams, Schwartz & Evans, P.A.

[57] ABSTRACT

A tie 24 seals an outer bag 26 and an inner line bag 28 of a container. The inner liner bag 28 is fed into a tubular discharge chute 30 and the tubular end of the outer liner bag is passed over the outside of a chute 30 to extend over an inflatable seal 32. Then two opposed pinch bars 34 on either side of the container, just below the tie 24, are actuated by pneumatic cylinders 36 to move towards each other and to pinch the inner and outer bags 26 and 28 just below the tie. Then a seal 32 is inflated to urge the seal against the inner face of the outer bag. Then the tie 24 is removed and the pinch bars are retracted before moving the chute 30 downwardly by retracting pneumatic cylinders 38 to take the lower end of the outer bag downwardly.

15 Claims, 9 Drawing Sheets

BAG DISCHARGE APPARATUS

TECHNICAL FIELD AND BACKGROUND OF THE INVENTION

The present invention relates to bag discharge apparatus and means for discharging a bag.

Previous machines for discharging flexible bulk containers comprise supporting the bulk container over a discharge chute sealing the neck to the discharge chute and untying a neck at the bottom of the container to allow material to flow out of the container through the discharge chute. However, the neck of the container is often narrow and the neck can tend to stay bunched up once the neck is untied and impede the effective discharge of material. This is particularly the case where a thin extremely flexible and disposable liner bag is located within a heavy reuseable outer bag.

Previous bag discharge machines have also suspended the bag from a support frame with the frame then being supported on spring biased poles and with the bottom of the bag being partially supported on a conical plate. As the weight of the bag on the support frame decreases during discharge spring means acting on the poles biases those poles and the frame support upwardly to assist in lengthening the main extent of the bag and allowing the bag base to drop downwards and therefore assist in causing material to leave the bag. However, the spring means are dependent upon the weight of material in the bag and, as that weight slowly decreases, the spring means slowly raises the bag to a limited extent and in a gradual manner. Furthermore the material in the bag can lock the base of the bag in position to act to stop the springs effectively raising the bag base thereby adversely affecting discharge. Accordingly, material can still tend to remain stacked up within the container without being effectively and smoothly discharged.

SUMMARY OF THE INVENTION

It is an object of the present invention to attempt to overcome at least some of the above described disadvantages.

According to one aspect of the present invention bag discharge apparatus comprises means to support a bag over a discharge opening, means to engage the lower region of a bag, and means to move the lower region of a bag downwardly relative to an upper region of the bag.

By causing such relative movement of the lower region of a bag, the lower region is pulled open to ensure discharge.

The means to move the lower region of a bag downwardly relative to an upper region of a bag may be arranged to occur before or during discharge of material from a bag.

The discharge apparatus may include means to at least partially support a lower portion of a bag with the means to engage the lower region of a bag being beneath the means that provides partial support for a lower portion of the bag and the relative movement may be arranged to be between the means to at least partially support the lower region of a bag and the means to engage the lower region of a bag. The means to at least partially support a lower portion of a bag may include an opening through which a part of a bag may extend downwardly to the lower region of a bag.

The means to engage the lower region of a bag may comprise a means to seal with a bag, such as an inflatable seal. The means to seal with a bag may be arranged to seal with the inner surface of the bag. The means that are arranged to engage the lower region of a bag may include a discharge chute that is arranged to move with the means to engage the lower region of a bag when the relative movement occurs.

The apparatus may include clamping means arranged to engage a portion of a bag at a higher elevation than the region where the lower region of a bag is arranged to be engaged. The clamping means may comprise opposed pushers that are movable towards each other to engage opposed sides of a bag. The clamping means may be arranged to be located between the means that are arranged to engage the lower region of a bag and the means that are arranged to at least partially support a lower portion of the bag.

The apparatus may include means arranged to move the lower region of a bag upwardly relative to an upper region of a bag after discharge of the contents of a bag.

The present invention also includes a method of discharging a bag comprising locating a bag to be discharged over a discharge opening, engaging the lower region of the bag and moving the lower region of the bag downwardly relative to an upper region of the bag.

The method may comprise causing the relative movement prior to or during discharge of the contents of the bag commencing.

The method may comprise at least partially supporting a lower portion of a bag and causing said relative movement between a region of a bag lower than the at least partial support for the lower portion of the bag and the lower region that is engaged.

The method may comprise engaging the lower region of a bag with a seal, such as an inflatable seal, before causing the relative downwards movement.

The method may comprise locating the bag over a discharge opening and then engaging the lower region of the bag and then releasing a tie that retains the contents within the bag and then causing the relative downwards movement of the lower region of the bag. The method may comprise clamping the bag prior to releasing a restraint that retains the contents of the bag.

The method may comprise moving the lower region of a bag upwardly relative to an upper region of the bag after discharge.

According to a further aspect of the present invention bag discharge apparatus comprises support means for an upper region of a bag arranged to at least partially support a bag over a discharge opening and actuator means arranged to move the upper region of a bag upwardly relative to a lower region of the bag.

Thus the actuator means are able to move the upper region of a bag upwardly, when desired.

The apparatus may be arranged to move the upper region of a bag upwardly relative to the lower region from a first position to a second predetermined position. Either or both of those positions may be adjustable. The apparatus may be arranged to cause the relative movement from the first position to the second position, and then to a third or more position or positions.

The actuator means may be arranged to move the upper region of a bag upwardly relative to a lower region upon sensing of a predetermined condition such as the weight of material remaining in the bag or the duration that the bag has been discharging from or the level within the bag.

The actuator means may be arranged to move the upper region of a bag upwardly relative to a lower region of the bag when the bag is approximately one third full.

The actuator means may be hydraulically or pneumatically actuated.

The actuator means may be arranged to move the upper region of a bag upwardly away from the support means that have previously provided support for an upper region of the bag.

According to a further aspect of the present invention a method of discharging a bag comprises at least partially supporting a bag over a discharge opening and subsequently actuating means to move the upper region of the bag upwardly relative to the lower region.

The method may comprise moving the upper region of the bag from a first position to a second predetermined position.

The method may comprise sensing the weight in the bag and then actuating the actuator means to move the upper region of the bag upwardly in response to the sensed weight.

The method may comprise moving the upper region of a bag off the support that initially at least partially supports the upper region of the bag when the upper region of the bag is moved upwardly relative to the lower region.

According to another aspect of the present invention bag discharge apparatus comprising a support for a bag having a generally quadrilateral cross-section when viewed in plan also comprises reciprocatable pushers arranged to move inwardly to, in use, urge a portion of the periphery of a bag inwardly, each pusher also being arranged to move outwardly is characterised in that the pushers are arranged to act on what, in use, will be a corner region of a quadrilateral bag.

The pushers may be arranged to act from one corner region such that, when moving inwardly, the pusher moves generally towards what, in use, will be an opposed corner region of the bag.

The pushers may be arranged such that a first pair of opposed corners of a bag are arranged to move inwardly and outwardly simultaneously and the pushers may be arranged such that a second pair of opposed corners different from the first pair are arranged to move inwardly and outwardly simultaneously. The pushers on the first pair of corners may be arranged to move inwardly when pushers on the second pair of corners are in an outer position and vice versa. Alternatively or additionally pushers may be arranged to act on each corner to move all corners inwardly simultaneously.

Each pusher may include a first portion arranged to act along one side of a bag, a second portion arranged to act along a second adjacent side of a bag and a third portion extending between the first and second portions arranged to act on the corner region of a bag. When all pushers are in an inwards position they may define, in plan, a generally eight sided restriction.

Each pusher may be arranged to cause a corner portion of the bag to move inwardly through a greater extent than the adjacent side portions of a bag.

The present invention also includes a method of discharging material in a bag, which bag has a generally quadrilateral cross-section when viewed in plan, the method comprising causing pushers to reciprocate inwardly to push a corner region of a bag inwardly with each pusher also being movable outwardly.

The pushers may be arranged to move inwardly simultaneously, or separately from each other, or in opposed pairs. The method may comprise moving pushers acting on each corner inwardly to be at an inner position after partial discharge of material from the bag and the pushers may remain in that inner position throughout the remainder of the discharge of material from the bag or the pushers may be retracted and possibly further reciprocated after they have all been at an inner position.

According to another aspect of the present invention bag discharge apparatus includes a support for a bag, with the bag having an outlet located at the bottom thereof, the apparatus including first pushing means arranged to urge the side wall of the bag inwardly and arranged to act on the bag at one elevation and second pushing means arranged to urge the side wall of a bag inwardly at a lower elevation than the first pushing means.

The second pushing means may be arranged to also push the wall of the bag upwardly when the wall of the bag is moved inwardly.

The first pushing means may be arranged to act on the corner region or regions of the bag.

According to another aspect of the present invention in a method of discharging a bag containing material in which the bag is located such that an outlet of the bag extends downwardly, the wall of the bag is caused to move inwardly at one elevation by a first pushing means and inwardly at a second, lower elevation by second pushing means.

The sides of a bag at different elevations may be arranged to be urged inwardly at the same time or at different times.

The method may comprise urging corner regions of the bag at the first elevation to move inwardly, either simultaneously or sequentially or in pairs with the walls of the bag at the lower elevation being caused to move inwardly either at the same time as the walls at the upper elevation or at a different time.

The walls of the bag at the second elevation may be arranged to move upwardly at the same time that they are moved inwardly.

According to a further aspect of the present invention bag discharge apparatus includes a support for a bag from which bag material is arranged to be discharged from an outlet at the lower region of the bag, the support being arranged to suspend such a bag and the apparatus further including abutment means arranged to be engaged by the support when the support is moved in a generally horizontal direction such that the support is arranged to accurately suspend the bag in the required position on the apparatus.

The support may be arranged to engage the abutment means to locate the bag in a lateral horizontal direction or in the correct angular position, when viewed from above, or both.

The abutment means may comprise two spaced members or upwardly extending means or both.

The present invention also includes a method of aligning a support for a bag suspended therefrom with a bag discharge apparatus comprising moving the support in a lateral direction such that the bag engages abutment means to accurately align the support for the bag, and therefore the bag that is suspended therefrom in position over the machine. When the bag is moved into contact with the abutment means the bag may be arranged to be restricted from further lateral movement, when viewed from above, and may be caused to turn upon engagement with the abutment means to correctly align the support means, and therefore the bag in an angular position, when viewed from above.

The present invention includes any combination of the herein referred to features or limitations.

The present invention can be carried into practice in various ways but one embodiment will now be described, with reference to the accompanying drawings in which:

DESCRIPTION OF THE PREFERRED EMBODIMENT AND BEST MODE

Figure 2:
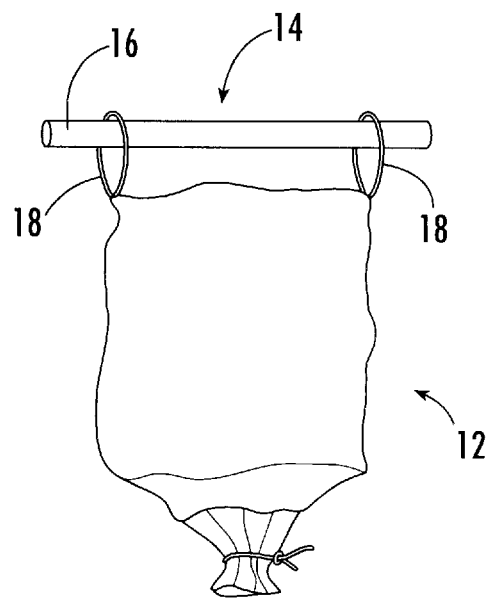
FIG. 2 is a schematic side view of a flexible bag container 12 mounted on a lift frame 14.
Figure 1:
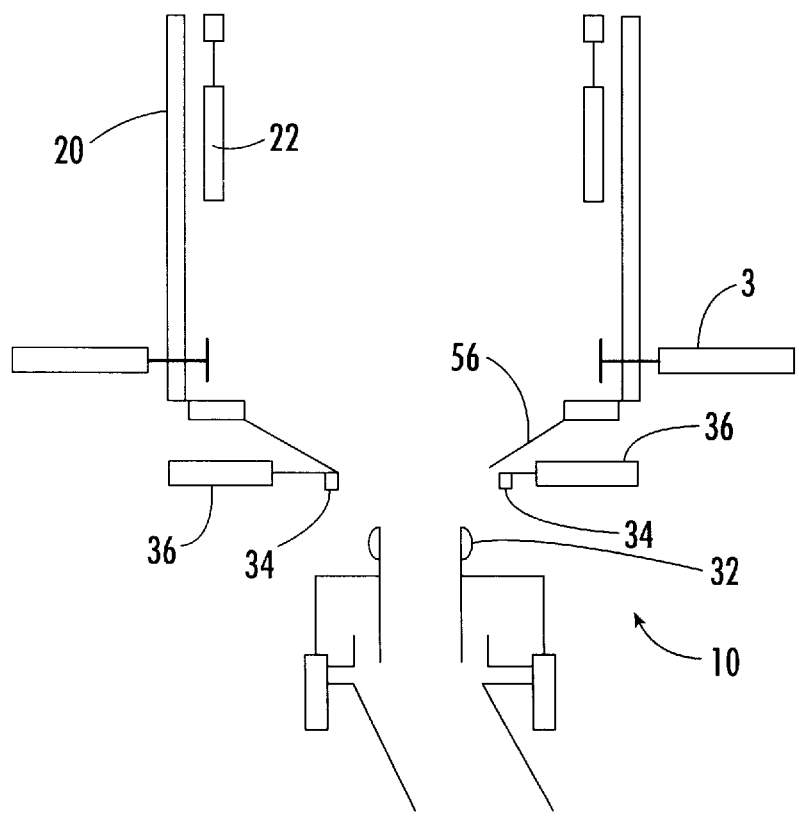
FIG. 1 is a schematic side view of a bag emptying apparatus 10.

The container 12 shown in FIG. 2 is suspended from spaced parallel bars 16 (only one of which is shown) which are connected together by spaced parallel bars (not shown) that extend inwardly of and perpendicular to the bars 16. Prior to the container being located over the emptying apparatus the container is rigged on to the frame comprised by the bars by passing four loops 18 over each protruding end of the bars 16. A fork lift truck or hoist then engages the frame by the forks extending under the frame 14 between two opposed pairs of loops 18 with the fork then being raised to support the frame with the container 12 being suspended from the frame. The container is then moved to locate the container over the apparatus 10 before the fork lift or hoist support is lowered to locate the bars 16 on support poles 20 of the emptying apparatus or on pneumatic lift cylinders 22 the purpose of which will be described later.

Figure 8:
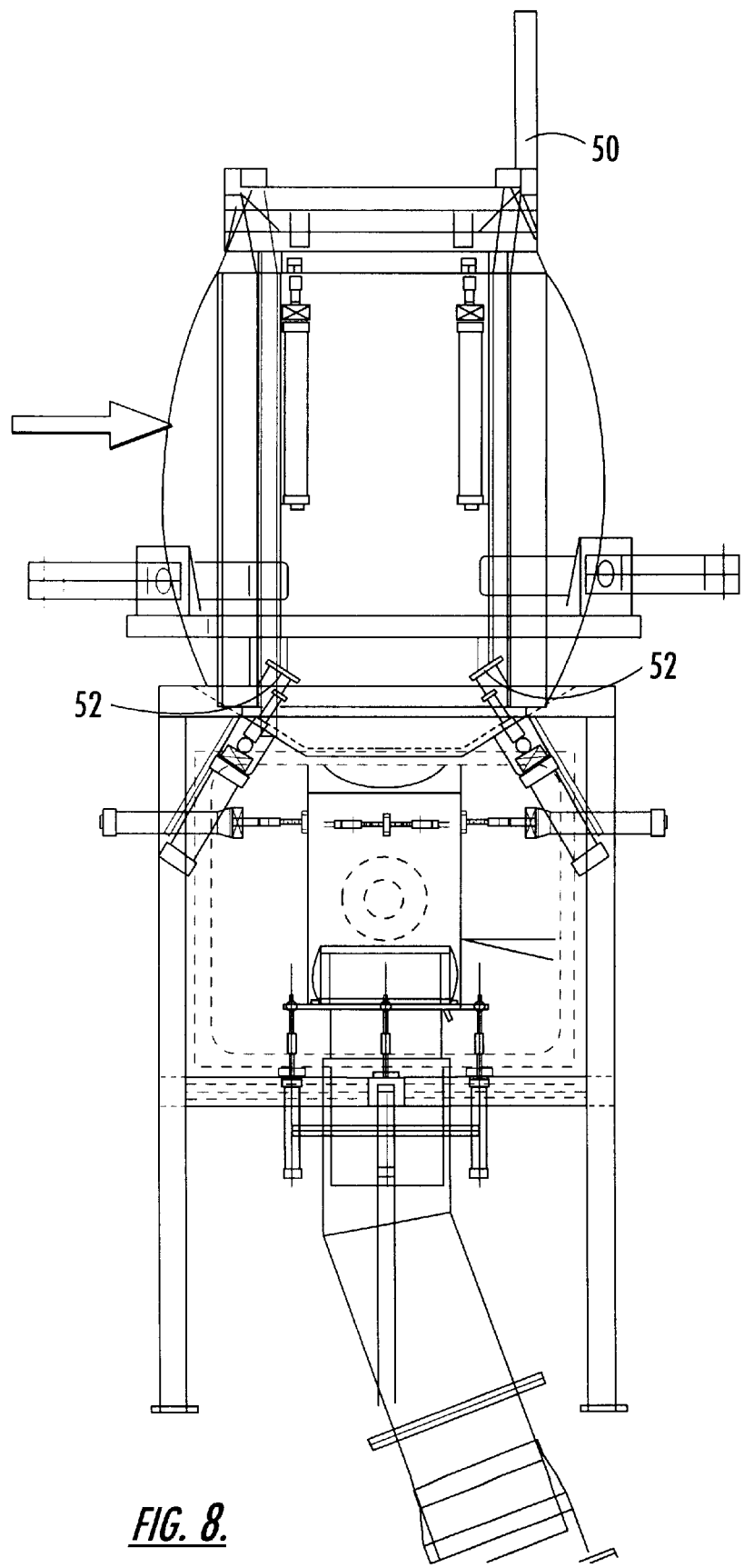
FIG. 8 is a side view of the bag emptying apparatus.
Figure 9:
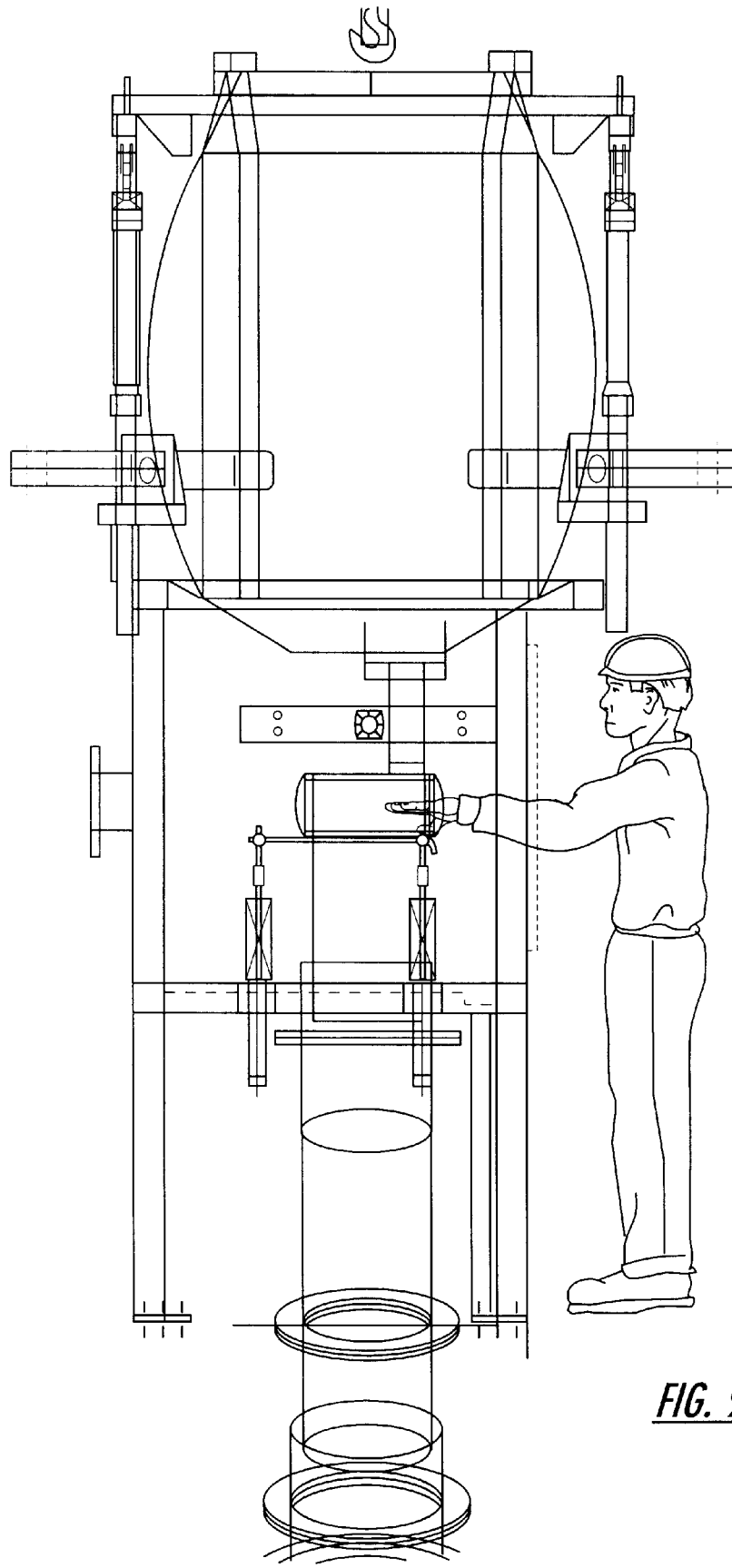
FIG. 9 is a front view of the bag emptying apparatus.

As shown in FIG. 8, the top of the frame may have a pair of spaced upwardly extending arms 50 (only one of which is shown). When the frame is swung over the apparatus by a hoist the bars of the frame can contact the arms 50 to cause one of the bars 16 to swing around until it abuts both arms 50 to accurately locate the frame and the suspended bag in position over the discharge chute.

Figure 3:
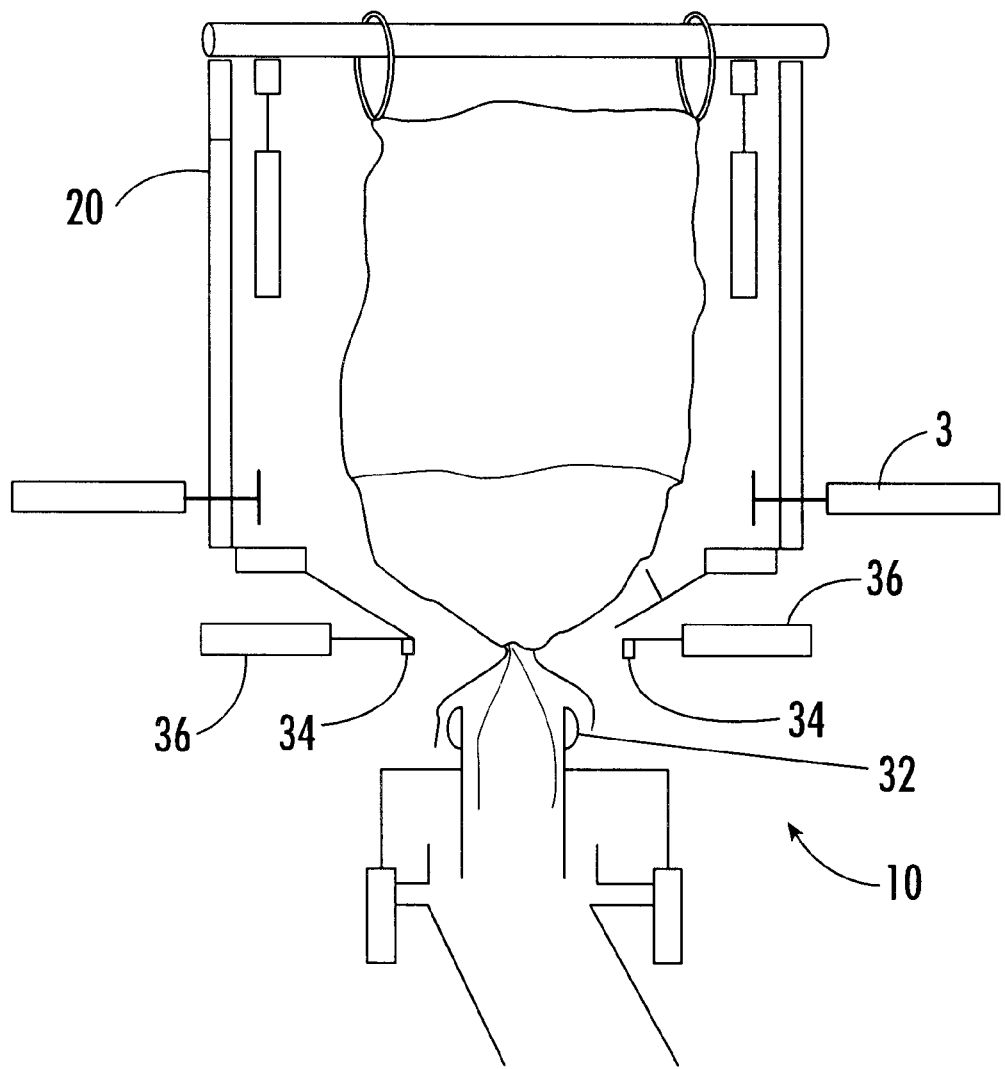
FIGS. 3 to 7 are sequential views showing the emptying sequence for the container 12.

The frame is then in the position shown in FIG. 3 with the container being suspended from the frame and with the lower portion of the container resting on a conical support plate 23 having a central lower opening 25.

The lower end of the container, which converges in a downwards direction to a tubular neck, extends through the opening 25, downwardly, to a tie 24 that seals the outer bag 26 and an inner liner bag 28 of the container. The inner liner bag 28 is fed into a tubular discharge chute 30 and the tubular end of the outer liner bag is passed over the outside of the chute 30 to extend over an inflatable seal 32.

Then two opposed pinch bars 34 on either side of the container, just below the tie 24, are actuated by pneumatic cylinders 36 to move towards each other and pinch the inner and outer bags 26 and 28 just below the tie.

Figure 4:
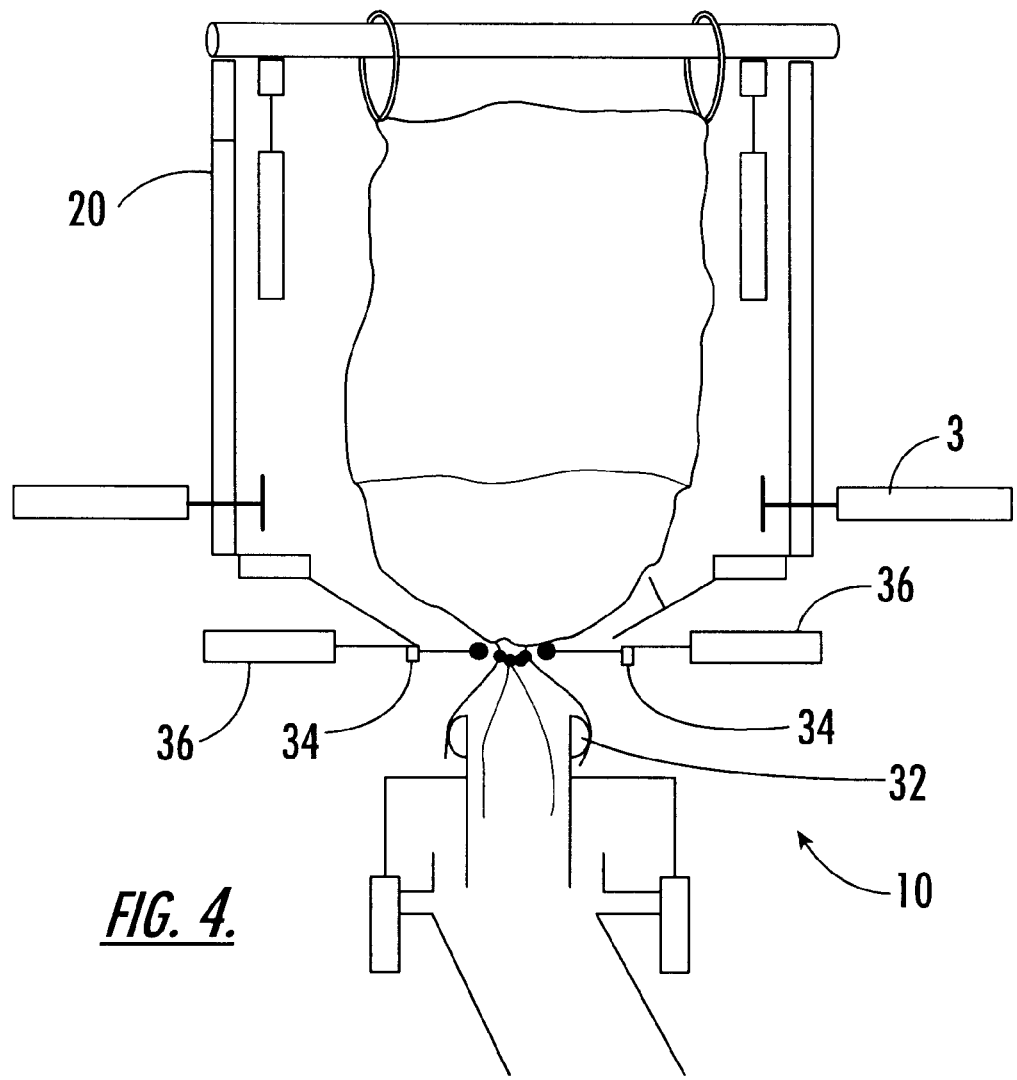

Then, as shown in FIG. 4, the seal 32 is inflated to urge the seal against the inner surface of the outer bag 26 in the region of its free end to hold and seal with that bag.

Following the holding and sealing of the outer bag the tie 24 is removed and the pinch bars are retracted before moving the chute 30 downwardly by retracting pneumatic cylinders 38 that are connected to a plate 40 that is fast with the chute 30. The chute 30 is then in the position shown in FIG. 5 in relation to an angled discharge chute 32. Alternatively the chute can be lowered during discharge, if desired.

Figure 5:
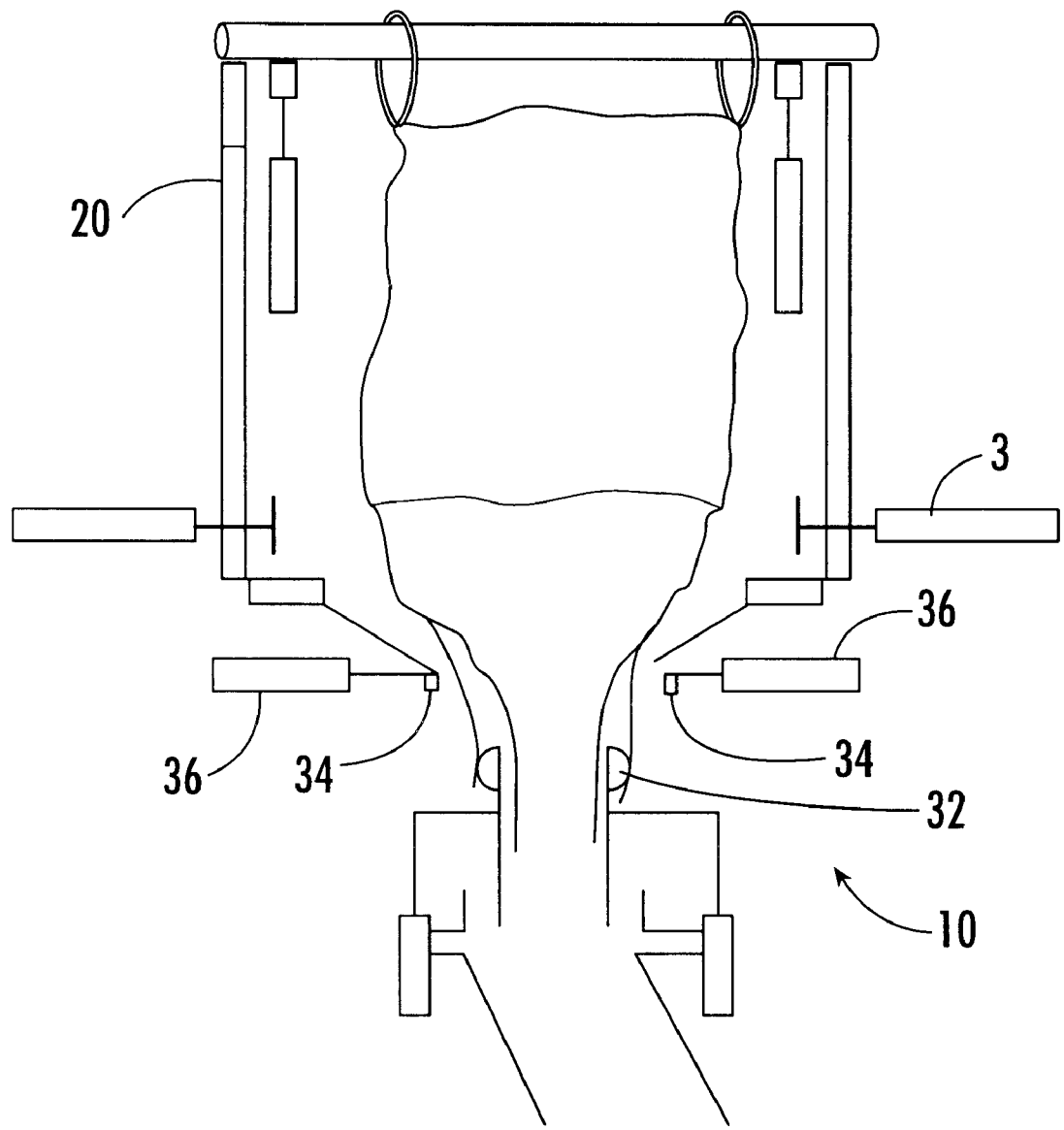

In the position shown in FIG. 5 the lower end of the outer bag is stretched or pulled down to allow free discharge through the lower part of the narrower inner and outer bags without the outer bag tending to bunch up and impede the smooth discharge flow through the inner bag.

The apparatus is also provided with four corner massage cylinders 44 secured to a side support frame 45. The height of these corner massagers is adjustable possibly by reversing the orientation of the frame 45. Each cylinder 44 includes a pusher plate 46 that is caused to urge the corners and sides of the bag repeatedly inwardly before being retracted to massage the lower part of the container during discharge and to prevent material from clogging in the narrower discharge area of the bag.

Figure 10:
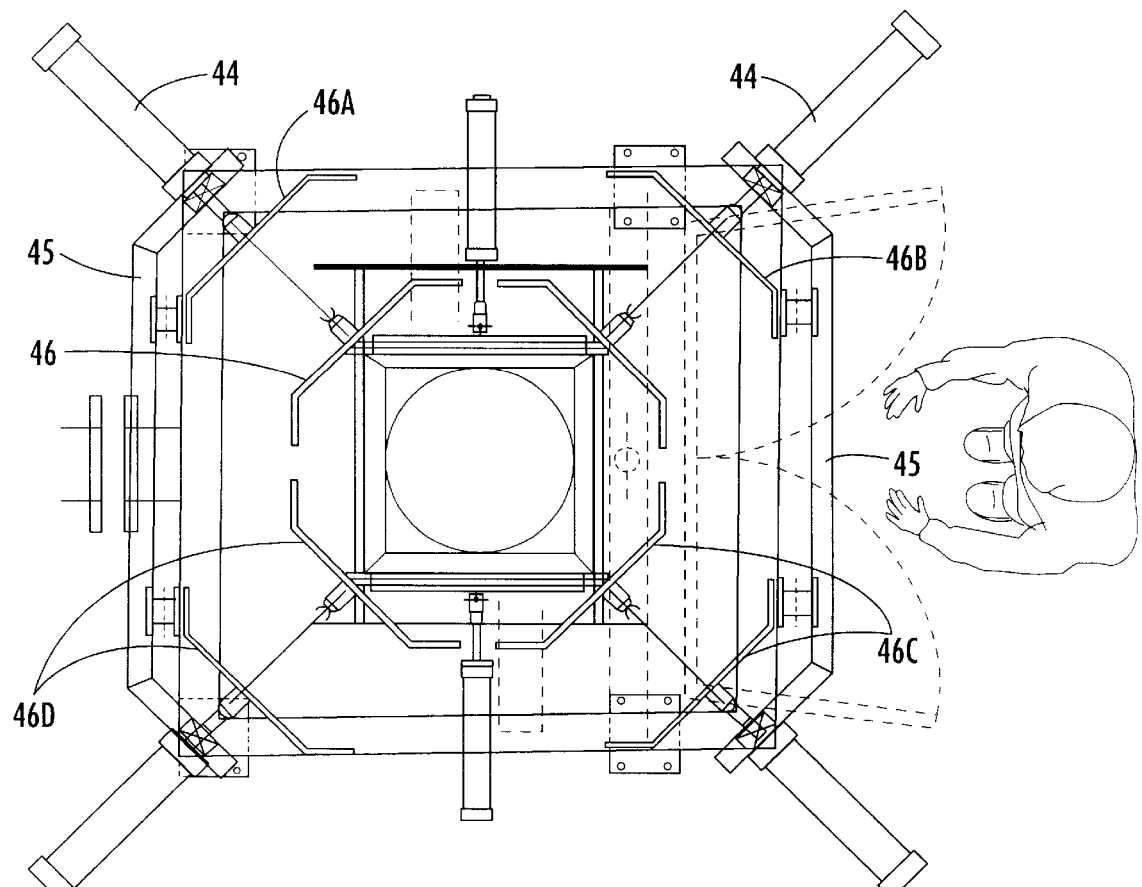
FIG. 10 is a plan view of FIG. 9.

The corner massage cylinder 44 are shown more clearly in FIG. 10. Each plate 46 is movable from a first outer position to a second, inner position. The four plates are shown as 46A to 46D. The sequence during the majority of the discharge is for the plates 46A and 46C to be moved in and then, after retraction of those plates, for the opposing plates 46B and 46D to be moved in and so on.

When the bag is low in level, possibly after the top of the bag has been raised, all four pusher plates are moved inwardly simultaneously. The plates can either be held in that position during the remainder of the discharge or subsequently they can be moved out or they can resume their reciprocation. It can be seen from FIG. 10 that each plate includes a flat central extent and two end portions that extend parallel to the sides. These ensure that any material in the corners is dislodged during discharge and that the sides of the bag are also moved in to a considerable extent during massage.

The apparatus is also provided with two opposed side pushers 52 that are pneumatically operated to push upwardly and inwardly on the base of the bag just above the neck of the bag. These pushers 52 can operate after the corner pushers have each been pushed in or out or in any relative sequence.

Figure 6:
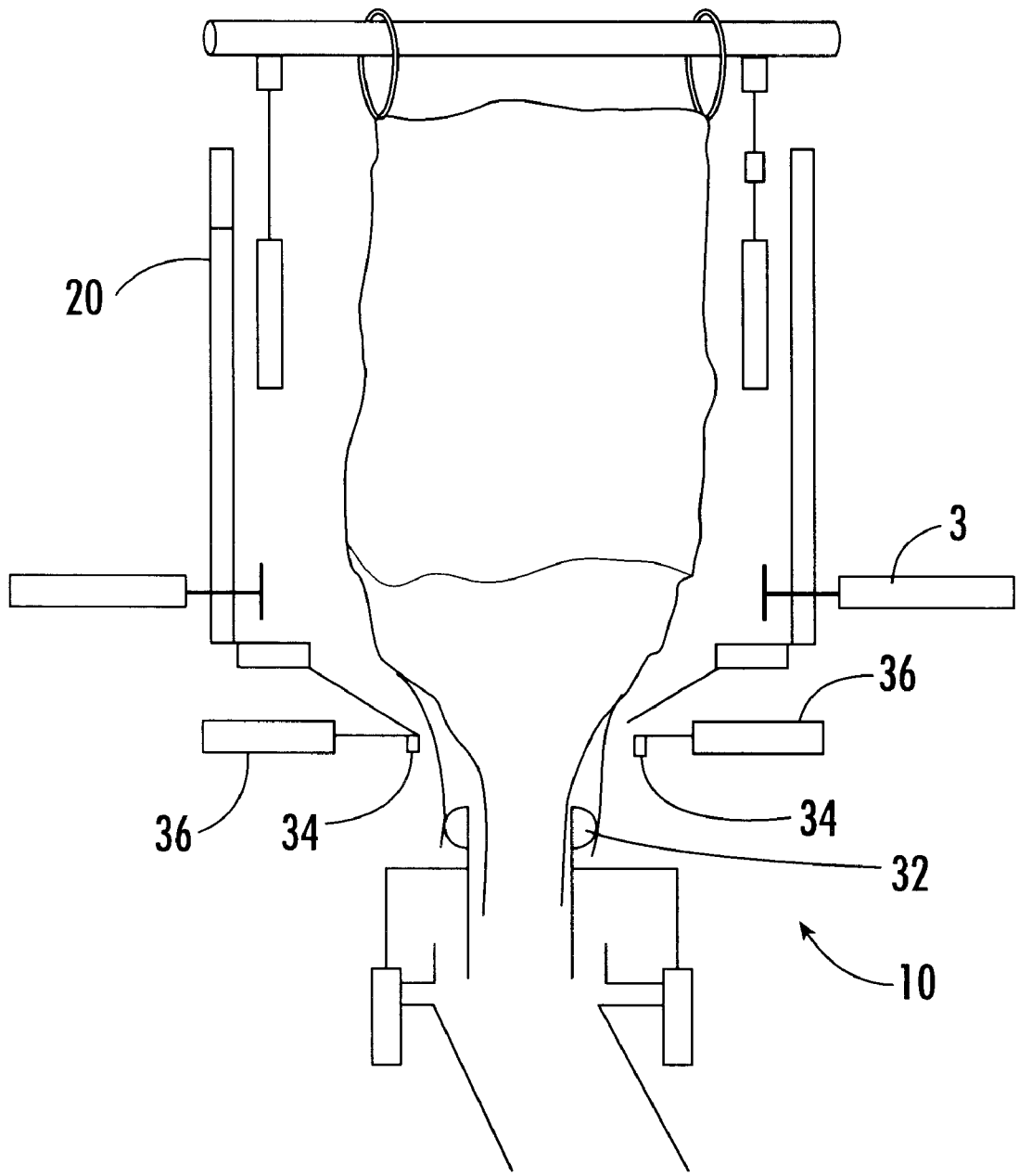
Figure 7:
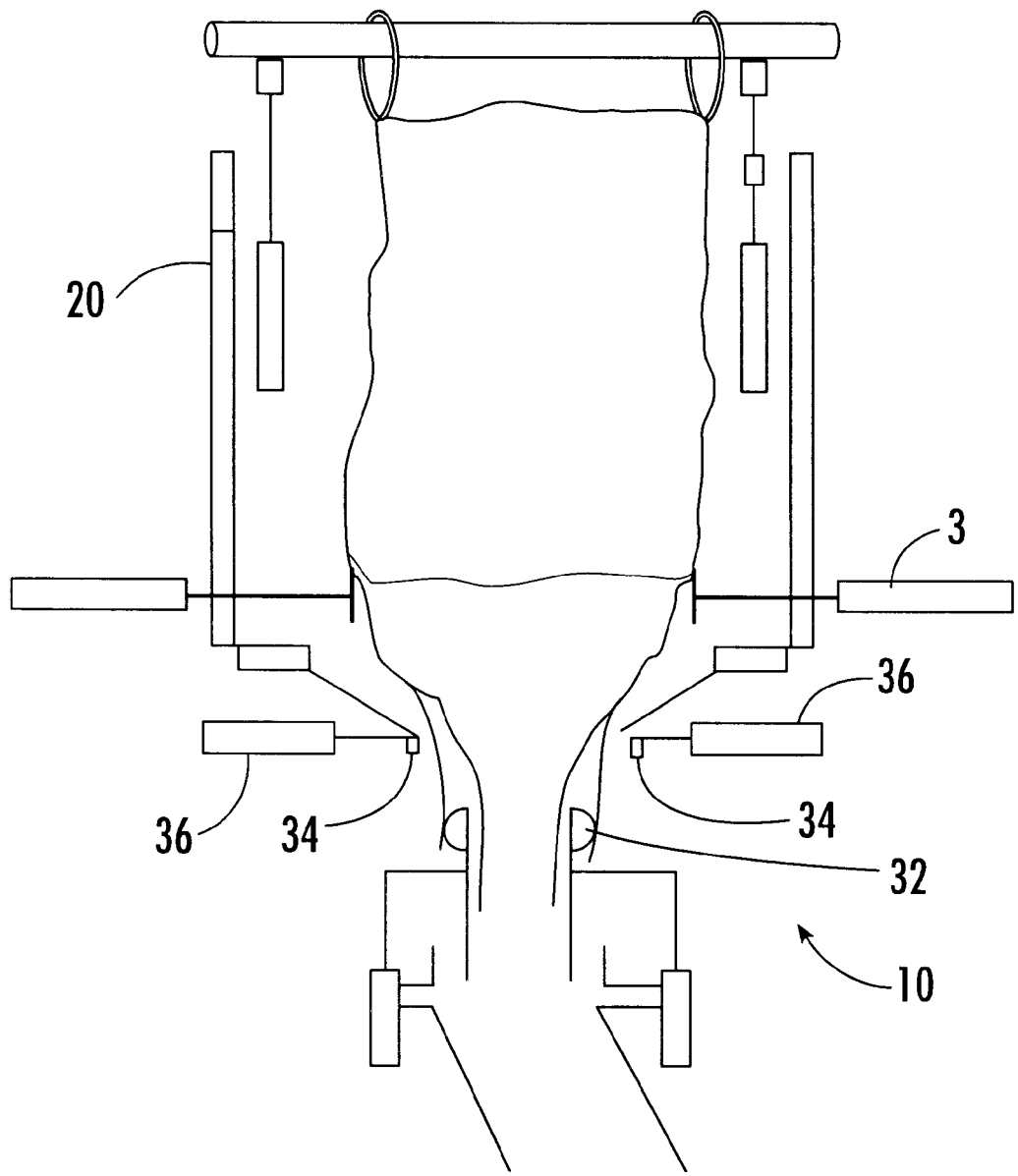

When the container is approximately two thirds empty the frame 14 is raised by actuating the hydraulic or pneumatic lift cylinders 22 to move the bars 16 upwardly, as shown in FIG. 6. This movement may directly lift the frame or may raise the frame off the poles 20. This movement straightens out the sides and base of the bag and pulls any material that may be locked in the corners out. As it may be a relatively quick movement, this will cause any build up of material in the lower region of the bag or adjacent to the side walls of the bag to be displaced and discharged. Alternatively the movement can be gradual.

The apparatus can be used with bags of different heights by making the starting and finishing points of the cylinders adjustable. The cylinders may be arranged to raise the bag in steps such as by arranging for two cylinders in parallel to effect the lifting.

The raising of the upper region of the bag may be arranged to occur when a predetermined level remains in the bag, after a predetermined period of discharge or when the weight of the bag reaches a predetermined value.

Instead of cylinders to raise the upper portion screw jacks could be used with a linear motor actuator.

As the neck of the bag is held at a low extended position, when the top frame is lifted by the actuators the bag will reduce in width and cause the lower corners of the bag to move in thereby causing any jamming or congestion of material in the lower region to be broken. The raising of the frame that supports the bag may lift the bag at least partially off the conical support 56 for the base of the bag.

Bag massage with the pushers 34 continues until the bag is empty. When the bag is fully discharged the pushers 34 are retracted, the lift cylinders 22 are retracted to lower the frame onto the poles and the neck 30 is raised by extending the pistons 38 and the pinch bars are applied. The tie on the container can then be replaced and the frame 14 can be engaged by a hoist or fork lift truck and raised to allow the frame and empty bag to be removed from the apparatus.

Then a previously rigged container can be loaded and discharged as referred to above in order that the discharge apparatus is idle for the minimum time.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A bag discharge apparatus of the type adapted for emptying material from a multi-layer bag including an inner liner and an outer layer, the bag having respective upper and lower regions, a plurality of sides defining adjacent corners, and a lower opening terminating in a neck having a discharge opening through which material is emptied, said apparatus including a frame for suspending the bag therefrom, the frame having at least four side support members affixed thereto for supporting the bag, a support plate having an opening defined therein for supporting the lower region of the bag and through which the material is discharged, and at least two lift means connected to the frame for moving the lower region of the bag downwardly relative to the upper region of the bag, wherein the improvement comprises:

(a) first, second, third and fourth corner massage cylinders attached to respective side support members and in respective interior corners of the frame for massaging the lower region of the bag by urging the corners of the bag repeatedly inwardly, thereby ensuring that any material contained in the corners is dislodged and for preventing the neck of the bag from clogging as material is discharged therethrough; and (b) an inflatable seal attached to said support plate and adapted for being positioned between the inner liner and the outer layer of the bag and for sealing the neck of the bag by inflatably communicating with an inner face of the outer layer of the bag, thereby preventing material from prematurely flowing through the discharge opening of the bag.

2. A bag discharge apparatus according to claim 1, wherein said cylinders include respective first, second, third and fourth retractable plates attached thereto for cooperating with the cylinders in removing material from the corners of the bag.

3. A bag discharge apparatus according to claim 2, wherein said retractable plates are movable from a first outer position to a second inner position.

4. A bag discharge apparatus according to claim 3, wherein each of said retractable plates includes a flat central portion defining two opposing side edges and two opposing end portions for ensuring that material is emptied from the corners of the bag and that the sides of the inner liner of the bag are moved inwardly as the lower region of the bag is massaged.

5. A bag discharge apparatus according to claim 4, wherein said cylinders include sequencing means for moving the retractable plates wherein each of the plates is movable from said outer position to said inner position in an alternating sequence with the other plates, thereby massaging corresponding corners of the bag.

6. A bag discharge apparatus according to claim 4, wherein said first and third plates are movable from said outer position to said inner position in an alternating sequence with said second and fourth plates, thereby massaging corresponding opposite corners of the bag.

7. A bag discharge apparatus according to claim 4, wherein said plates are simultaneously movable inwardly for emptying said bag when the level of materials contained therein is low.

8. A method for emptying material from a multi-layer bag including an inner liner and an outer layer, the bag having respective upper and lower regions, a plurality of sides defining adjacent corners, and a lower opening terminating in a neck having a discharge opening through which material is emptied, the method including the steps of providing an apparatus for emptying material from the bag, the apparatus including a frame for suspending the bag therefrom, the frame having at least four side support members affixed thereto for supporting the bag, a support plate having an opening defined therein for supporting the lower region of the bag and through which the material is discharged, and at least two lift means connected to the frame for moving the lower region of the bag downwardly relative to the upper region of the bag, positioning the bag over the opening, and moving the lower region of the bag relative to the upper region of the bag, wherein the improvement steps comprise:

(a) providing first, second, third and fourth corner massage cylinders attached to respective side support members and in four respective interior corners of the frame;

(b) massaging said corners of the bag by urging the corners repeatedly inwardly to dislodge any material contained in the corners and prevent the neck of the bag from clogging as the material is discharged therethrough;

(c) providing an inflatable seal positioned between the inner liner and the outer layer of the bag; and (d) sealing the lower region of the bag by inflating the seal against an inner face of the outer layer to seal the lower region, thereby preventing material from prematurely flowing through the discharge opening of the bag.

9. A method for emptying material from a bag according to claim 8, wherein the step of massaging the corners of the bag includes the step of massaging all four corners of the bag simultaneously.

10. A method for emptying material from a bag according to claim 9, wherein the step of providing said cylinders includes the step of providing respective first, second, third and fourth retractable plates attached to respective first, second, third or fourth cylinders.

11. A method for emptying material from a bag according to claim 10, wherein the step of providing each of said plates includes the step of providing a flat central portion on a face of each plate having two opposing side edges and two opposing end portions for ensuring that material is emptied from the corners of the bag and that the sides of the inner liner of the bag are moved inwardly as the lower region of the bag is massaged.

12. A bag discharge apparatus according to claim 11, further comprising the step of sequencing the movement of the cylinders for moving the retractable plates from said outer position to said inner position in an alternating sequence with the other plates, thereby massaging corresponding corners of the bag.

13. A method for emptying material from a bag according to claim 11, further comprising the step of sequencing movement of the cylinders for moving said first and third plates from the outer position to the inner position in an alternating sequence with said second and fourth plates, thereby massaging corresponding opposite corners and sides of the bag.

14. A method for emptying material from a bag according to claim 10, further comprising the step of providing sequencing means attached to said cylinders for simultaneously moving the plates inwardly for emptying the bag when the level of materials contained therein is low.

15. A method for emptying material from a bag according to claim 11, 12, or 13, wherein the step of providing said seal comprises inflating the seal prior to performing the step of moving the lower region of the bag downwardly relative to said upper region of the bag.

* * * * *